C. R. EDWARDS.
Coffee Mill.
No. 23,082.
Patented March 1, 1859.
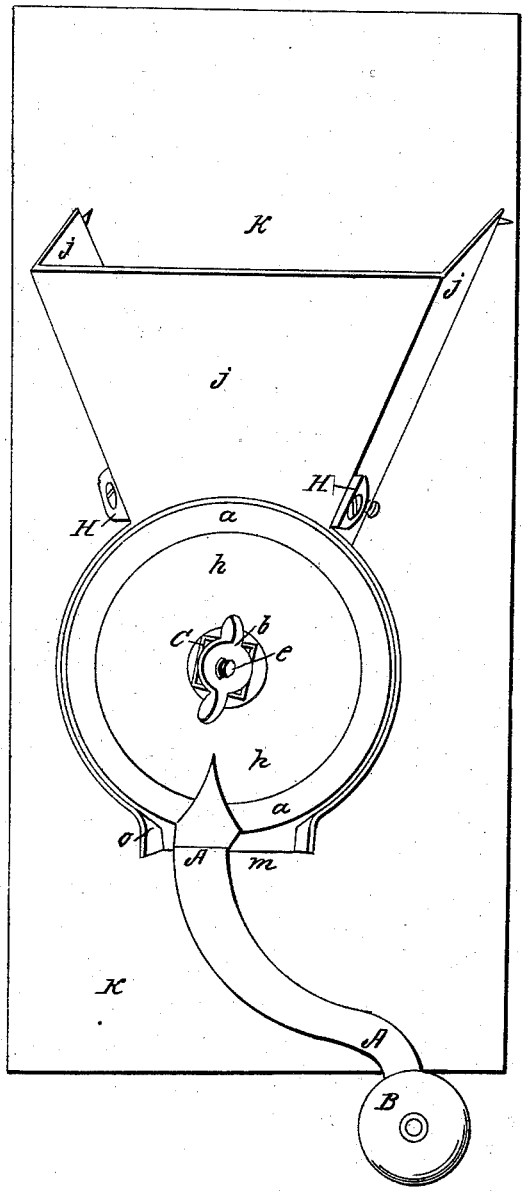
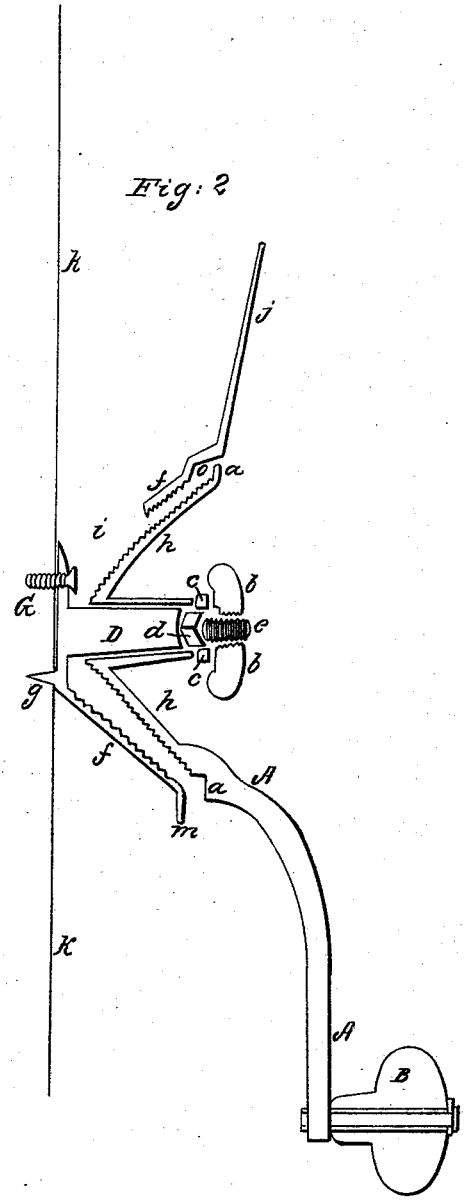
Witnesses:
V. Beers.
O. S. Shepard.
Inventor:
Charles R Edwards

UNITED STATES PATENT OFFICE.

CHARLES R. EDWARDS, OF SUSPENSION BRIDGE, NEW YORK.

IMPROVEMENT IN SPICE AND COFFEE MILLS.

Specification forming part of Letters Patent No. 23,082, dated March 1, 1859.

*To all whom it may concern:*

Be it known that I, CHARLES R. EDWARDS, of Niagara City, (Suspension Bridge P. O.,) in the county of Niagara and State of New York, have invented a new and useful Improvement in Spice or Coffee Mills, the grinders being easily and readily taken apart and conveniently exposed for cleaning the mill; and I do hereby declare that the following is a full, clear, and exact description of the construction and operation of the same, reference being had to the annexed drawings, making a part of this specification, in which—

Figure 1 shows a perspective view, and Fig. 2 shows a side view of the mill as if it were divided through the center from top to bottom.

In both figures like letters show like parts of the mill.

In Fig. 1 the hopper is shown at *j j j*, the three sides being cast, if desired, with the lower part of the mill or the concave grinder, as shown by Fig. 2 at *f f*, or the concave grinder may be cast of iron and the hopper made of tin.

The mill may be fastened to a board *k k*, nailed or screwed against the wall or other place. The mill is fastened to the board by screws, as at H H, Fig. 1, and a screw at G, Fig. 2; also, a spur cast on the back of the mill, as shown at G, Fig. 2, may be made to enter a brad-hole in the board.

In each figure *h h* and A A show how the burr and crank are cast in one piece.

The coffee or spice enters the grinders from the hopper through the hole in the hopper or concave grinder at *i*, Fig. 2.

The arm or axle D is cast with and on the concave grinder, as shown, and the burr is revolved on said axle, which turning of the burr *h h* produces the grinding of the spice or coffee.

The burr *h h*, Fig. 2, is held from slipping off the axle D by the screw and nut *e b b*, and the burr is also tightened so as to grind finer by the same screw and nut.

Between the nut *b b* and the hub of the burr is shown a washer *c c*. This washer has a square hole fitting the end of the axle, thus allowing the hub of the burr to revolve without turning the nut by the friction of its revolution.

At *a a* (shown by both figures) is a flange, cast on and around the burr. This flange helps to form the groove or space shown at *o*, Fig. 2, and helps to prevent the spice or coffee flying out and to conduct it down to be delivered at *m*. The back part of the hopper may be formed by whatever the mill shall be fastened to, as at *k*.

The grinding edges or surface of the burr and concave grinder may be constructed in manner or shape as has been long used and known in coffee-mills.

At B in Fig. 2 is shown the wooden knob and how it may be attached to the crank by which knob the crank is revolved.

What I claim is—

The burr *h h*, provided with the flange *a a* and handle, cast in one piece, in connection with the concave grinder having the axle D cast upon the same, arranged and constructed substantially as and for the purposes set forth.

CHARLES R. EDWARDS.

Witnesses:
LEWIS W. MYERS,
JOHN SYMES.